May 29, 1962 R. MATTHEY 3,036,871
DEVICE FOR PIVOTING A MOVABLE ELEMENT OF
A CLOCKWORK MOVEMENT OR OF
A SMALL MECHANISM
Filed Sept. 15, 1960
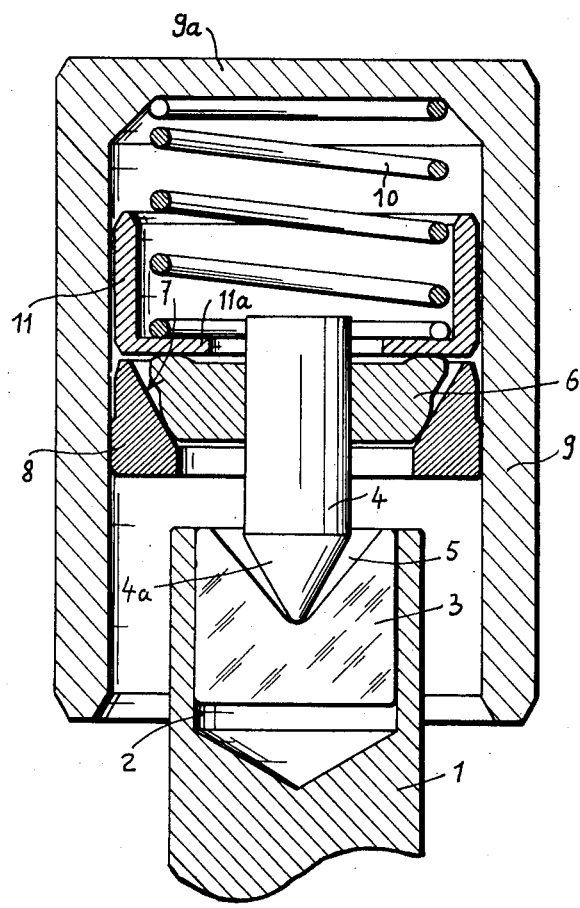

United States Patent Office 3,036,871
Patented May 29, 1962

1

3,036,871
DEVICE FOR PIVOTING A MOVABLE ELEMENT OF A CLOCKWORK MOVEMENT OR OF A SMALL MECHANISM
Roger Matthey, Le Sentier, Switzerland, assignor to Parechoc S.A., Le Sentier, Switzerland, a firm
Filed Sept. 15, 1960, Ser. No. 56,173
Claims priority, application Switzerland Sept. 30, 1959
2 Claims. (Cl. 308—159)

The present invention relates to a device for pivoting a movable element of a clockwork movement or of a small mechanism, wherein the shaft has, at at least one of its ends, an axial recess into which a projection of the bearing penetrates.

The said device is characterised in that the said projection is mounted in a bearing support in such manner as to be able to move radially and axially, a resilient return device acting thereon in order to bring it into the centred position, the whole arrangement being such as to damp the axial and radial shocks to which the shaft may be subjected.

The drawing illustrates by way of example a constructional form of the subject of the invention.

The FIGURE is an axial section through a bearing and through the end of the shaft of the movable element (not shown), which is pivoted by the device according to the invention.

The shaft illustrated is denoted by 1. Its end is formed with a coaxial recess 2, into which an end stone 3 is driven.

The bearing comprises a projection consisting of a rod 4, of which the conical end 4a penetrates into the also conical hole 5 of the end stone 3. The said rod 4 is driven into an annulus 6, constituting an external shoulder of the rod, and which rests on a frustoconical seat 7 formed in a fixed ring 8 driven into a socket 9; this socket is in turn adapted to be driven into the frame of the clockwork movement or of the apparatus on which the present device is mounted. The ring 8 and the socket 9 form together a bearing support.

2

In addition, a coil spring 10 bears on the end 9a of the socket 9, on the one hand, and on the annulus 6, on the other hand, through a sleeve 11 sliding within the socket 9 and formed with an inner ledge 11a. The latter bears on the annulus 6 under the action of the spring 10 and prevents the rod 4 from tilting under lateral shocks to which the shaft is subjected.

Thus, when such shocks occur, the rod 4 moves laterally and parallel to itself, rising along the frustoconical surface of the seat 7 against the action of the spring 10. In the event of axial shocks, the annulus 6 leaves the seat 7, thereby compressing the spring 10.

In a modified form, provision may be made for the recess 2 in the shaft 1 to receive directly the end of the projection of the bearing, which projection may then consist of a jewel.

The invention may also be applied in cases where the bearing is not a shock absorber, as in the illustrated example, but is fixed, its projection being rigidly mounted thereon.

What I claim is:

1. In a shock-absorbing bearing for the movable element of a clockwork or of a small mechanism, a tubular support, a pin disposed with clearance within said tubular support, an external shoulder of the said pin, an internal seat formed in the said tubular support, a sleeve, provided with an inner ledge, slidingly mounted in the said tubular support and a spring intended to return the said pin to its central position, the said spring acting on the said sleeve for urging the said ledge against the said shoulder, thereby urging the said shoulder against the said seat.

2. A shock-absorbing bearing as claimed in claim 1, in which the said pin is made of a jewel.

References Cited in the file of this patent
UNITED STATES PATENTS

| | | |
|---|---|---|
| 1,843,868 | Copelin | Feb. 2, 1932 |
| 2,919,961 | Matthey | Jan. 5, 1960 |
| 2,970,017 | Zaslawsky | Jan. 31, 1961 |
| 2,996,339 | Loretan | Aug. 15, 1961 |